(12) United States Patent
Dry et al.

(10) Patent No.: US 7,935,172 B2
(45) Date of Patent: May 3, 2011

(54) IRONMAKING AND STEELMAKING

(75) Inventors: Rodney James Dry, City Beach (AU); Robin John Batterham, Parkville (AU)

(73) Assignee: Technological Resources Pty Limited, Victoria (AU)

( * ) Notice: Subject to any disclaimer, the term of this patent is extended or adjusted under 35 U.S.C. 154(b) by 425 days.

(21) Appl. No.: 10/587,469

(22) PCT Filed: Jan. 31, 2005

(86) PCT No.: PCT/AU2005/000112
§ 371 (c)(1),
(2), (4) Date: Mar. 26, 2007

(87) PCT Pub. No.: WO2005/073412
PCT Pub. Date: Aug. 11, 2005

(65) Prior Publication Data
US 2007/0256518 A1    Nov. 8, 2007

(30) Foreign Application Priority Data

Jan. 30, 2004 (AU) ............................... 2004900407

(51) Int. Cl.
*C21C 7/076* (2006.01)
*C21B 13/12* (2006.01)
(52) U.S. Cl. .............. 75/560; 75/10.35; 75/569; 75/570
(58) Field of Classification Search .................. 75/10.35, 75/560, 569, 570
See application file for complete search history.

(56) References Cited

U.S. PATENT DOCUMENTS

| 4,274,867 | A | 6/1981 | Bardenheuer et al. | |
|---|---|---|---|---|
| 6,083,296 | A * | 7/2000 | Innes et al. | 75/502 |
| 6,241,798 | B1 * | 6/2001 | Dimitrov et al. | 75/10.63 |
| 6,332,910 | B1 | 12/2001 | Edlinger | |
| 6,334,885 | B1 * | 1/2002 | Fukushima et al. | 75/746 |
| 6,383,250 | B1 * | 5/2002 | Lynn et al. | 75/313 |
| 6,391,086 | B1 * | 5/2002 | Contrucci et al. | 75/319 |
| 6,438,154 | B2 * | 8/2002 | Vallomy | 373/9 |

(Continued)

FOREIGN PATENT DOCUMENTS

AU    70604/81 A    11/1981

(Continued)

OTHER PUBLICATIONS

Mishra, B. "Steelmaking Practices and Their Influence on Properties" from http://products.asminterational.org/hbk/do/highlight/content/MH/D04/A02/index.html downloaded Apr. 22, 2009. Copyright 2002 ASM International.*

*Primary Examiner* — George Wyszomierski
*Assistant Examiner* — Tima M McGuthry-Banks
(74) *Attorney, Agent, or Firm* — Miles & Stockbridge P.C.; David R. Schaffer; Patrick L. Miller

(57) ABSTRACT

A steelmaking process is disclosed. The process includes producing molten steel and molten steelmaking slag in a steelmaking process, the steelmaking slag including iron units and flux units, and thereafter producing molten iron in a molten bath based direct smelting process using a substantial portion of the steelmaking slag as part of the feed material requirements for the direct smelting process. A direct smelting process is also disclosed. The process includes pre-treating ferrous material including steelmaking slag and thereafter direct smelting molten iron using the pretreated ferrous material as part of the feed material for the process.

29 Claims, 3 Drawing Sheets

U.S. PATENT DOCUMENTS 6,939,391 B2 * 9/2005 Dry et al. .................. 75/501

FOREIGN PATENT DOCUMENTS

| GB | 1556833 | A |   | 11/1979 |
| --- | --- | --- | --- | --- |
| JP | 54032194 | A | * | 3/1979 |
| JP | 1-104707 | A |   | 4/1989 |
| JP | 2-209408 | A |   | 8/1990 |
| JP | 3-277710 | A |   | 12/1991 |
| JP | 4-110407 | A |   | 4/1992 |
| JP | 10-219330 | A |   | 8/1998 |

* cited by examiner

IRONMAKING AND STEELMAKING

FIELD OF THE INVENTION

The present invention relates to steelmaking, particularly steelmaking in an integrated steelmaking plant.

The present invention also relates to ironmaking, particularly via a molten bath based direct smelting process.

The present invention is concerned with improving the economics of operating steelmaking plants, particularly integrated steelmaking plants, by making effective use of steelmaking slag and dusts and other steelmaking plant by-products that are generally regarded as low value wastes.

The present invention makes it possible to use these steelmaking by-products as feed materials to an ironmaking process and thereby reduce:

(a) the overall amount of waste that is produced by ironmaking operations and steelmaking operations; and (b) the amounts of feed materials for ironmaking operations that are required from other sources.

The present invention is based on the use of a direct smelting process and apparatus for producing molten iron (which term includes ferrous metal alloys) that is capable of using steelmaking plant by-products, such as steelmaking slag and dusts, as a feed material for the direct smelting apparatus.

The direct smelting process and apparatus may be part of an integrated steelmaking plant or may be a separate operation altogether that processes steelmaking by-products produced in one or more than one separate steelmaking operation.

BACKGROUND OF THE INVENTION

Traditional iron and steelmaking processes produce slag. Both ironmaking slag and steelmaking slag are considered to be waste products of these respective processes.

Steelmaking slag typically contains iron units in the form of FeO and flux units in the form of lime (CaO). Typically, the iron units are 35% by weight of the slag and the flux units are 25-35% by weight of the slag.

When the steelmaking slag is disposed of in accordance with prior art practice, the iron and lime units are lost.

Significant economic and environmental benefits would be gained if it were possible to recover or reuse iron and lime units from steelmaking slag.

Recycling of steelmaking slag to prior art ironmaking vessels such as traditional blast furnaces in order to recover or reuse the iron and lime units is not considered to be a viable option. One reason for this is that phosphorus in feed materials that are supplied to typical blast furnaces tends to partition to the molten iron produced in the furnace. When this molten iron is subsequently supplied to a steelmaking vessel, the phosphorus partitions into the steelmaking slag in order to produce steel of required chemistry. Thus, recycling steelmaking slag to a typical blast furnace is not practical and would simply result in an increasing phosphorus load in down stream steelmaking vessels. This is undesirable.

Whilst blast furnaces are the traditional option for producing iron from iron ore, various molten bath-based direct smelting processes have been proposed with a view to avoiding disadvantages of blast furnaces, such as the need for sintering and coke making operations. Such direct smelting processes include, by way of example, the Romelt, DIOS (Direct Iron Ore Smelting), and HIsmelt processes.

The Romelt process operates at ambient pressure using a molten iron and slag bath with ore fines and non-coking coal dropped in from above. Oxygen and an air/oxygen mixture are injected at each of two elevations through side tuyeres. to stir the melt and post-combust bath gas.

The DIOS process is another molten iron and slag bath-based process and operates under pressure (1 to 2 bar g) and uses top-feed of coal and ore. Unlike Romelt, it uses a top lance for oxygen injection and has a fluidised bed system for iron ore pre-reduction. In the smelter, most of the reduction occurs in a foamy slag layer. There are significant temperature and FeOx gradients within the reactor (higher temperatures and higher FeOx levels at the top of the slag layer).

The HIsmelt process developed by the applicant is another molten iron and slag bath-based process and differs from 'deep slag' smelters such as DIOS and Romelt in that the solids fed to the vessel are injected significantly deeper into the melt. This leads to stronger mixing in the vessel, with hardly any temperature gradients in the liquid. The HIsmelt process is described, by way of example, in International applications PCT/AU96/00197 (WO 96/31627) and PCT/AU01/00222 (WO 01/64960) in the name of the applicant and the disclosure in these International applications is incorporated herein by reference.

It has previously been reported that the HIsmelt process is able to process iron ores such as high phosphorus Brockman ores and produce a pig iron with less than 0.05% phosphorus for downstream steelmaking. In contrast to the traditional blast furnace, the HIsmelt process has a more oxidising slag which results in extremely effective partitioning of phosphorus to the slag. During pilot plant testing it was reported by the applicant that 90 to 95% of the phosphorus fed to the HIsmelt pilot plant vessel reported to the slag. The DIOS and Romelt processes are also believed to preferentially partition phosphorus to slag.

It has also previously been reported that steelmaking slag in the form of fines can be used as a feed material that is supplied directly to a direct smelting vessel operating in accordance with the HIsmelt process—see paper entitled "HIsmelt—Competitive Hot Metal from Ore Fines and Steel Plant Wastes" by the subject inventor, R J Dry, and others, prepared for METEC Congress, 14-15 Jun. 1999. The left hand column on page 4 of the paper mentions that steel plant reverts, including BOF slag, can provide carbon credits that reduce the coal requirements for the HIsmelt process flowsheet shown in FIG. 3 of the paper.

SUMMARY OF THE INVENTION

The applicant has carried out further research work into possible applications of the HIsmelt process and has realised that there is substantial scope to use steel plant reverts, particularly steelmaking slag and dusts, as sources of iron units and flux units in direct smelting processes, such as the HIsmelt process.

In particular, in the context of integrated steelmaking, the applicant has realised that an integrated steelmaking plant that includes direct smelting operations that can efficiently partition phosphorus to the slag and steelmaking operations can be operated so that:

(a) the direct smelting operations take a substantial proportion, typically at least 70% by weight, of the steelmaking slag and dusts that would otherwise be regarded as low value wastes and use these steelmaking by-products as a valuable part of the feed materials that contribute iron and flux units for the direct smelting operations; and (b) the low phosphorus iron produced in the ironmaking operations can be used as a feed material for the steelmaking operations.

The overall outcome of the above realisation is (a) production of molten iron that can be used in the steelmaking operations, (b) a significant reduction in the net amount of slag and dust produced by the plant, and (c) a significant reduction, typically at least 30% by weight, of the amount of flux that is required from other sources.

In addition, in particular, in the context of ironmaking, the applicant has realised that a direct smelting apparatus that includes a pre-treatment unit that at least preheats and optionally also prereduces ferrous feed material and a process based on the use of the pre-treatment unit and a direct smelting vessel is a particularly effective option for processing steelmaking slag, with the steelmaking slag being supplied at least in part to the direct smelting vessel via the pre-treatment unit. This direct smelting apparatus and process may be part of the above-described integrated steelmaking plant or be a separate independent operation altogether that processes steelmaking by-products, such as steelmaking slag and dusts, from one or more than one steelmaking operation.

According to the present invention there is provided, in broad terms, a steelmaking process that includes the steps of:

(a) producing molten steel and molten steelmaking slag in a steelmaking process in a steelmaking vessel, the steelmaking slag including iron units and flux units; and (b) producing molten iron in a direct smelting process in a direct smelting vessel containing a molten bath of iron and slag using a substantial portion of the steelmaking slag as part of the feed material requirements for the direct smelting process.

Preferably step (b) includes using at least 70% by weight of the steelmaking slag as part of the feed material requirements for the direct smelting process.

More preferably step (b) includes using at least 80% by weight of the steelmaking slag as part of the feed material requirements for the direct smelting process.

It is preferred particularly that step (b) includes using at least 90% by weight of the steelmaking slag as part of the feed material requirements for the direct smelting process.

Preferably step (b) includes using sufficient steelmaking slag to provide at least 50% by weight of the flux units of the feed material requirements of the direct smelting process.

Preferably the process is an integrated steelmaking process and includes producing molten iron in at least one ironmaking vessel and supplying the molten iron as a ferrous feed material for step (a).

The ironmaking vessel may be any suitable ironmaking vessel such as a blast furnace and a molten bath-based direct smelting vessel.

The process may include using iron produced in step (b) as at least part of the ferrous feed material for producing steel in step (a).

The process may include using iron produced in step (b) and in at least one other ironmaking vessel as the ferrous feed material for producing steel in step (a).

Preferably step (b) includes controlling the direct smelting process to smelt the ferrous feed material and substantially partition phosphorus to the slag.

Preferably the direct smelting process is a HIsmelt process. The direct smelting process may be any other molten bath-based direct smelting process.

Preferably the process includes pre-treating ferrous feed material including steelmaking slag containing iron and flux units for step (b) by at least heating the ferrous feed material in a pre-treatment unit.

Preferably the pre-treatment step includes heating and at least partially reducing the ferrous feed material in the pre-treatment unit.

Preferably the pre-treatment step includes preheating the ferrous feed material to at least 400° C., more preferably at least 700° C.

Preferably the pre-treatment step includes preheating the ferrous feed material to a temperature less than 1050° C., more preferably less than 900° C.

Preferably the pre-treatment step includes wet scrubbing an offgas produced in the step and using wet sludge containing steelmaking slag in the process.

In many situations it may be impractical to rely solely on the use of steelmaking slag as the sole source of flux due to the steelmaking slag typically including only 25 to 35 wt % CaO and the other constituents of the slag not being suitable as ironmaking flux. Thus, for a known addition of lime, three times the tonnage of steelmaking slag would be required. In these situations it is appropriate to add one or more additional slag forming agents.

Preferably the direct smelting process includes using a slag forming agent to provide flux units for the process in addition to the flux units provided by the steelmaking slag.

Preferably the direct smelting process includes injecting the slag forming agent directly into the direct smelting vessel as opposed to pretreating the slag forming agent before injection into the vessel as is the case with the steelmaking slag.

Preferably the amount of the slag forming agent injected directly into the direct smelting vessel is sufficient to provide up to 30% by weight of the flux requirements of the direct smelting process.

Preferably the additional slag forming agent includes calcium oxide.

More preferably the calcium oxide is in the form of lime, burnt lime, dolomite or combinations thereof.

Preferably the process includes cooling the steelmaking slag produced in step (a) prior to using at least a portion of the steelmaking slag in step (b).

Preferably the process further includes reducing the size of the cooled steelmaking slag prior to adding the steelmaking slag in step (b).

A particularly preferred size range is minus 6 mm.

According to the present invention there is also provided a steelmaking plant for producing molten steel in accordance with the above process that includes:

(a) a steelmaking apparatus for producing molten steel and molten steelmaking slag;

(b) an ironmaking apparatus for producing molten iron.

According to the present invention there is also provided a direct smelting process for producing molten iron in a direct smelting vessel containing a molten bath of iron and slag, the process including the steps of:

(a) pre-treating ferrous feed material including steelmaking slag containing iron and flux units by at least heating the ferrous feed material in a pre-treatment unit; and (b) direct smelting molten iron in a direct smelting vessel containing a molten bath of iron and slag using the pre-treated ferrous feed material including steelmaking slag from step (a) as part of the feed material requirements for the direct smelting vessel.

Preferably step (a) includes heating and at least partially reducing the ferrous feed material.

Preferably step (a) includes preheating the ferrous feed material to at least 400° C., more preferably at least 700° C.

Preferably step (a) includes preheating the ferrous feed material to a temperature less than 1050° C., more preferably less than 900° C.

Preferably step (a) includes wet scrubbing an offgas produced in the step and using wet sludge containing steelmaking slag in the process.

Preferably the process includes using a slag forming agent to provide flux units for the process in addition to the flux units provided by the steelmaking slag.

Preferably the process includes injecting the slag forming agent directly into the direct smelting vessel as opposed to pretreating the slag forming agent before injection into the vessel as is the case with the steelmaking slag.

Preferably the amount of the slag forming agent injected directly into the direct smelting vessel is sufficient to provide up to 30% by weight of the flux requirements of the direct smelting process.

Preferably the additional slag forming agent includes calcium oxide.

More preferably the calcium oxide is in the form of lime, burnt lime, dolomite or combinations thereof.

Preferably step (b) includes controlling conditions within the direct smelting vessel to smelt the ferrous feed material to iron in the bath and to substantially partition phosphorus to the slag.

Preferably step (b) includes controlling conditions within the direct smelting vessel to partition phosphorus to the slag by maintaining the slag in an oxidising condition whereby the partition ratio of phosphorus in the iron to phosphorus in the slag is at least 1:5.

More preferably the above-described ratio is 1:10.

It is preferred particularly that the ratio be in the range of 1:10-1:30.

Preferably step (b) includes controlling conditions within the direct smelting vessel to partition phosphorus to the slag by maintaining the slag temperature to be in the range of 1350-1450° C. and the amount of FeO in the slag to be at least 3% by weight.

Preferably step (b) includes injecting the pre-treated ferrous feed material and a solid carbonaceous material, and an oxygen-containing gas into the vessel.

The steelmaking slag added in step (b) may be sourced from any steelmaking plant using any known steelmaking process including but not limited to any of the BOF processes and/or electric arc furnaces (EAF). In either case, preferably the steelmaking slag is cooled in accordance with known techniques so as to be in the form of pellets, granules or powder.

It is preferred that the steelmaking slag be generated within an integrated steelmaking plant including at least one direct smelting vessel and at least one steelmaking vessel at a single site, as described above.

BRIEF DESCRIPTION OF THE DRAWINGS

Embodiments of the present invention are now described, by way of example only, with reference to the accompanying drawings, of which.

DETAILED DESCRIPTION OF EMBODIMENTS OF THE INVENTION

Figure 1:
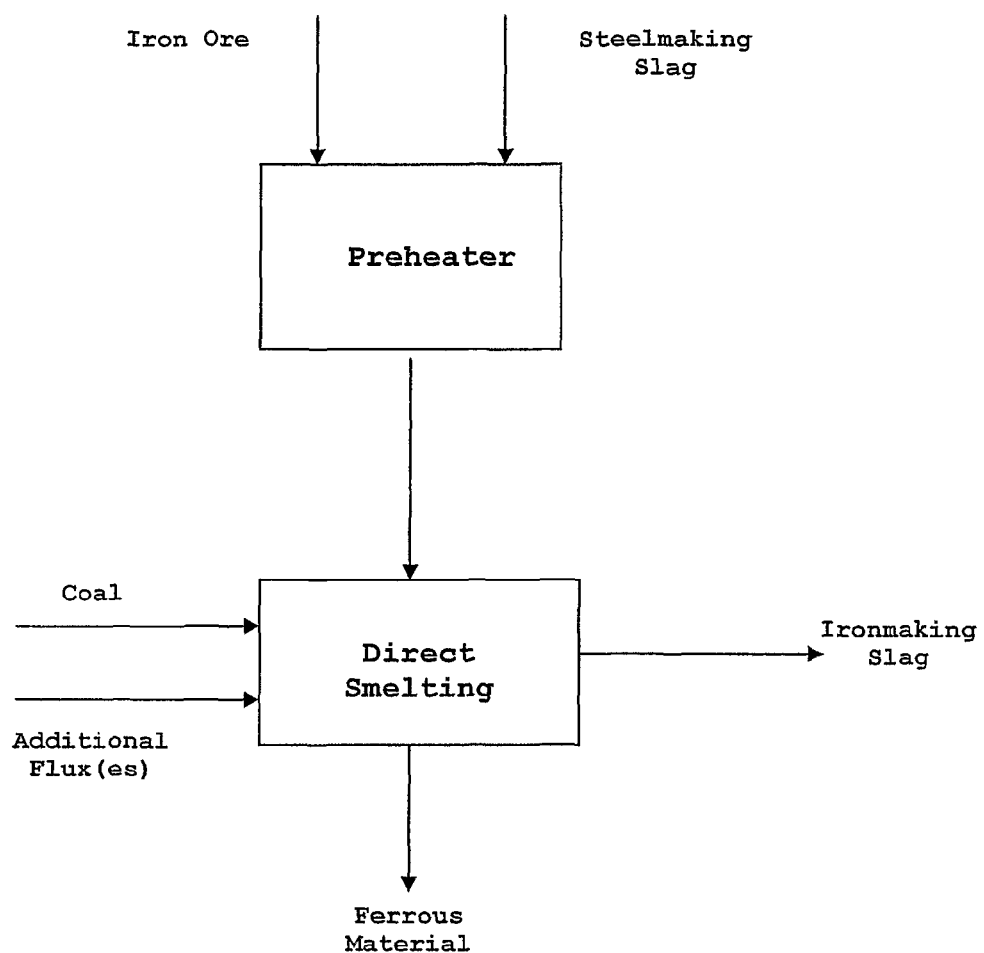
FIG. 1 illustrates schematically one embodiment of a process flowsheet.

With reference to FIG. 1, there is provided:

(a) an ironmaking apparatus including a pre-treatment unit in the form of a preheater, typically a shaft furnace or a fluidised bed, and (b) a direct smelting vessel that is suitable particularly for operation by the HIsmelt process as described in International patent application PCT/AU96/00197, the contents of which are incorporated herein by reference.

In use, iron ore fines and steelmaking slag obtained from any external source are screened to 0 to 6 mm size and are fed to the preheater. Typically, the steelmaking slag includes 35% by weight iron units and 25-35% by weight flux units.

The steelmaking slag and the iron ore are heated together in the preheater to a temperature in the range of 400-900° C. and are fed to the direct smelting vessel.

The direct smelting vessel includes injection lances (not shown) that receive hot ore fines and hot steelmaking slag from the preheater and inject these hot solids at a temperature of the order of 350-850° C. into the vessel.

Preheating steelmaking slag is not subject to the difficulties associated with preheating flux such as lime. The main difficulty with preheating lime is that lime that is taken up with offgas from the preheater tends to dissolve in wash water in wet scrubbers (not shown) that clean the offgas and are lost from the process. This is a serious issue because of the high cost of flux. Steelmaking slag does not dissolve in scrubber water and therefore can be recovered in wet sludge produced in wet scrubbers and re-used in the process.

In use, carbonaceous material, typically coal, and additional slag-forming fluxes, typically lime are also fed to the vessel.

The direct smelting vessel includes injection lances (not shown) that receive and inject the carbonaceous material and the additional slag-forming fluxes into the vessel. The carbonaceous material and fluxes may be blended together and injected and/or injected separately.

The injection of these additional fluxes directly into the vessel, as opposed to passing the additional fluxes through the preheater first as is the case with the steelmaking slag, is important as a control mechanism of the process. Typically, such direct flux injection is up to 30% by weight of the total flux requirements.

The HIsmelt process also operates with air or oxygen-enriched air and therefore generates substantial volumes of offgas which may be used for preheating the materials fed to the direct smelting vessel.

The process conditions within the direct smelting vessel are controlled such that the phosphorus in any of the solid materials fed to the vessel partitions preferentially to the slag. In the case of the HIsmelt process, this is achieved by ensuring that the FeO in slag is in the range 4-6% by weight and the temperature is in the range of 1400-1450° C. Under these process conditions, the partition ratio of phosphorus in the slag to phosphorus in metal is in the range of 5:1 to 20:1.

The hot metal produced in the direct smelting vessel is sufficiently low in phosphorus (less than 0.05% by weight) to be readily used as a feed material to a downstream steelmaking plant (not shown) which may be located on the same or at another site.

Figure 2:
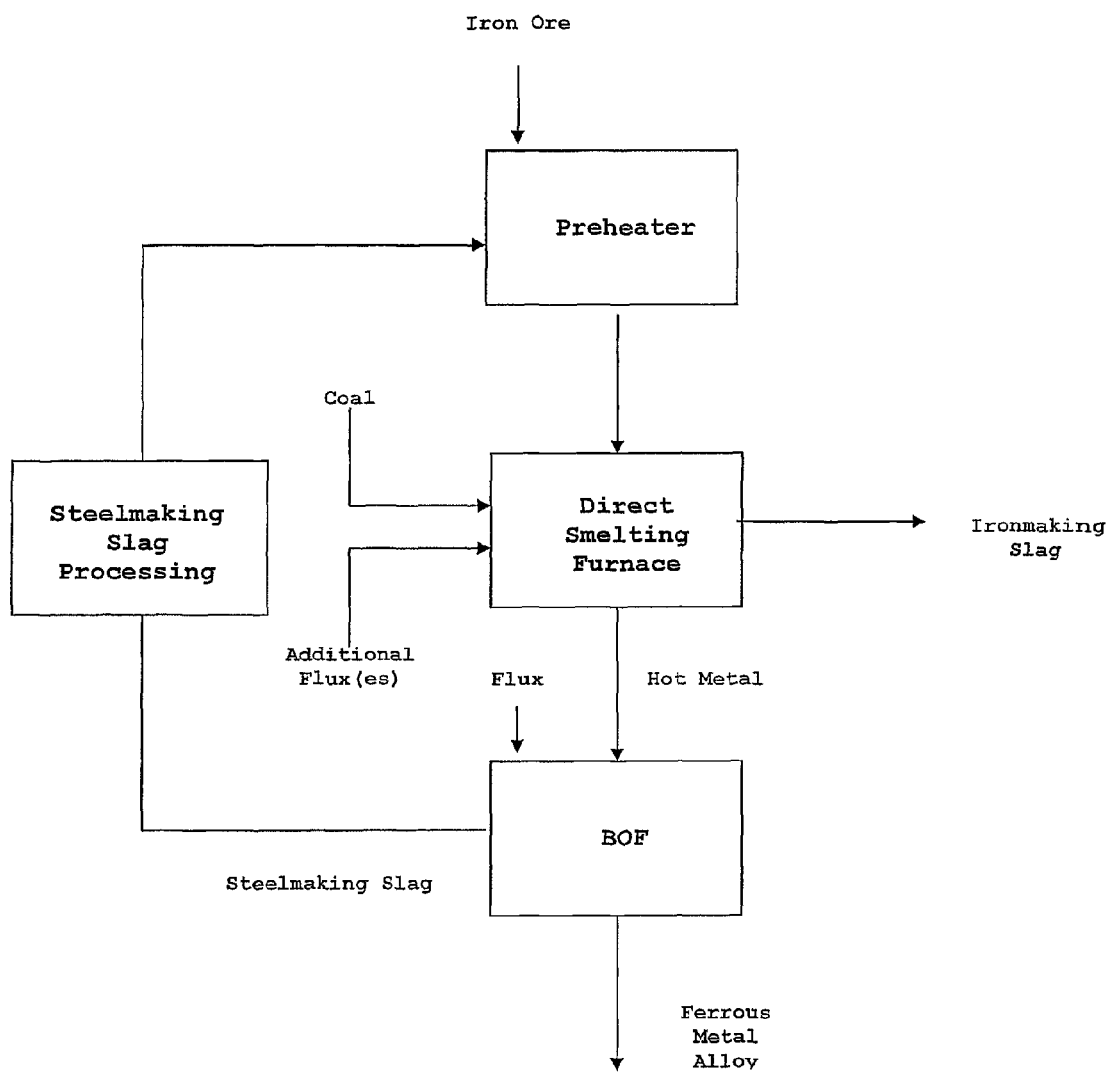
FIG. 2 illustrates schematically another embodiment of a process flowsheet; and, FIG. 3 illustrates schematically another (but not the only other) embodiment of a process flowsheet.

With reference to FIG. 2, there is provided an integrated steelmaking plant including one or more than one BOF and a direct smelting apparatus for producing hot metal as a feed to the one or more than one BOF. The steelmaking slag from the BOF is recycled to form one component of the slag-forming flux to the direct smelting apparatus. The direct smelting apparatus includes a preheater unit and a direct smelting vessel operating in accordance with the HIsmelt process as shown in and described above with reference to FIG. 1.

The one or more than one BOF is typically also charged with scrap metal prior to the addition of the ladles of hot metal from the direct smelting vessel. Typically, the scrap is charged first before the hot metal to avoid splashing. After the scrap is charged, the hot metal is charged into the BOF. Based on the chemistry of the charge and the temperature and the specific alloy being produced in the steelmaking process, the amounts of flux and oxygen added to the BOF are calculated. As for ironmaking, the typical flux added includes CaO (from burnt lime) and MgO (from dolomitic lime).

When the oxygen blow is finished, the steelmaking slag is allowed to float to the top of the bath of the molten steel. The steel is tapped from the BOF followed by tapping of the steelmaking slag.

The steelmaking slag is typically tapped into slag pots (not shown) and either quenched or allowed to cool. The cooled slag is fed to a means for processing the steelmaking slag, which may include size reduction apparatus such as crushers and screens and/or magnetic separators for recovering carried over steel. The cooled and screened steelmaking slag is then fed to the preheater of the ironmaking apparatus.

Figure 3:
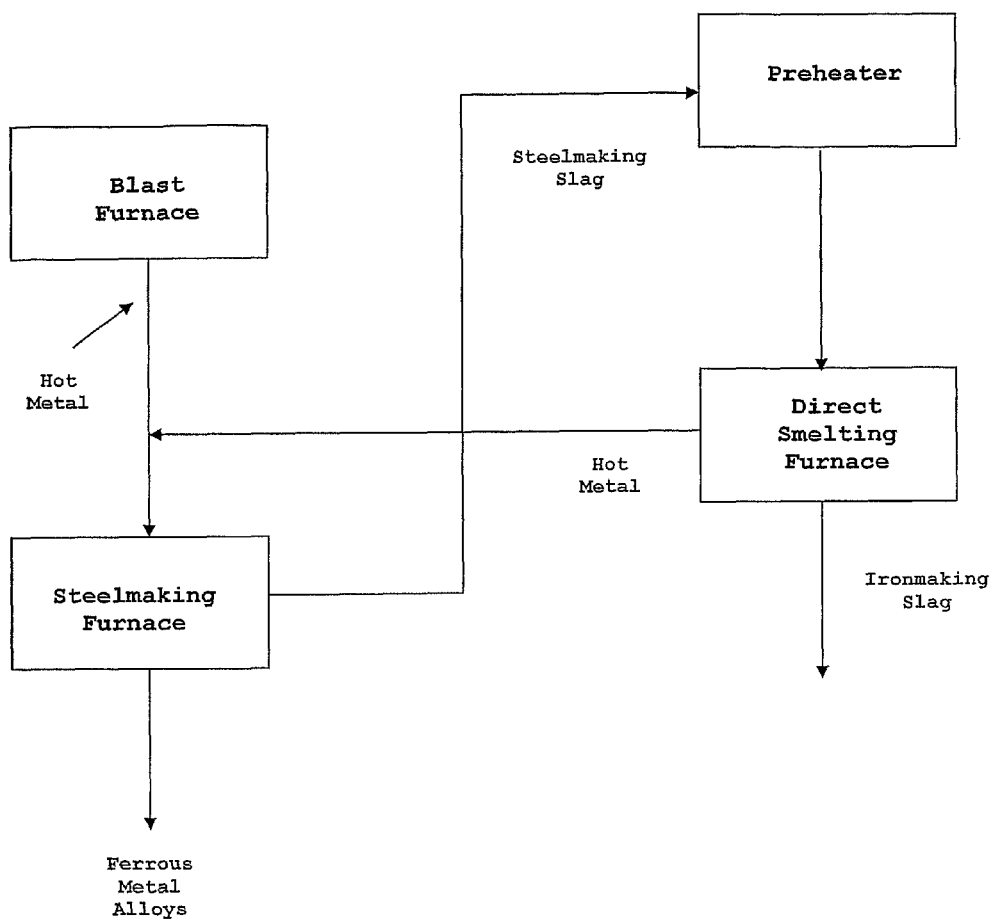

In the arrangement of FIG. 3, in use, the steelmaking apparatus, such as a BOF, is charged with (a) hot metal from a direct smelting vessel as described above with reference to FIG. 2 and (b) hot metal from a traditional blast furnace. The steelmaking slag generated in the steelmaking apparatus is recycled to the direct smelting apparatus in the manner described above with reference to FIG. 2. As the traditional blast furnace is not able to tolerate high phosphorus feeds, the steelmaking slag is not recycled as a flux to the blast furnace. The typical partition ratio of phosphorus in the slag to phosphorus in the iron for a blast furnace is 0.1 compared with 10 to 20 for the HIsmelt process.

The applicant has carried out computer modelling on the process flowsheets shown in FIGS. 2 and 3 and a Comparative flowsheet.

The modelling work was based on the use of a pre-treatment unit/direct smelting vessel operating in accordance with the HIsmelt process and producing of the order of 0.8 million tonnes per annum (Mt/a) of molten iron.

The modelling work was also based on the use of a BOF steelmaking vessel producing 0.7 Mt/a in the case of the Comparative and FIG. 2 flowsheets and 2.4 Mt/a in the case of the FIG. 3 flowsheet.

Brief details of the results of the modelling work for the Comparative flowsheet and the FIGS. 2 and 3 flowsheets are set out below.

Comparative Flowsheet—pre-treatment unit/direct smelting vessel and steelmaking vessel, with no steelmaking slag return to the pre-treatment unit.

In accordance with the model, the hot metal feed to the steelmaking vessel is 104.9 t/hr iron. The steelmaking vessel produces 6.6 t/hr slag and 1.6 t/hr dust. The direct smelting vessel takes no slag and no dust. The slag and dust are disposed of in accordance with standard practices. The iron ore feed to the direct smelting vessel is 197.5 t/hr iron ore fines and recycled smelting process dust. The direct smelting vessel produces 32.9 t/hr slag and 104.9 t/hr iron.

FIG. 2 Flowsheet—pre-treatment unit/direct smelting vessel and steelmaking vessel, with steelmaking slag return to the pre-treatment unit.

In accordance with the model, the hot metal feed to the steelmaking vessel comprises 105.7 t/hr iron. The steelmaking vessel produces 6.7 t/hr slag and 1.6 t/hr dust. The direct smelting vessel takes 6.0 t/hr slag and 1.4 t/hr dust. These amounts equate to 89.5% and 87.5%, respectively of the slag and dust produced by the steelmaking vessel. The total iron ore feed to the direct smelting vessel is 192.8 t/hr iron ore fines, steelmaking slag, steelmaking dust, and recycled smelting process dust. The direct smelting vessel produces 33.9 t/hr slag and 105.7 t/hr iron.

When compared with the Comparative flowsheet, and bearing in mind that both processes produced substantially the same amounts of molten iron and the same amounts of molten steel, it is evident that the impact of slag return was to:

(a) reduce total slag produced by the steelmaking vessel and the direct smelting vessel by 4.9 t/hr; and (b) reduce total iron ore feed requirements for the direct smelting vessel by 4.7 t/hr.

FIG. 3 Flowsheet—pre-treatment unit/direct smelting vessel, blast furnace, and steelmaking vessel, with steelmaking slag return to the pre-treatment unit.

In accordance with the model, the hot metal feed to the steelmaking vessel comprises 200 t/hr iron from the blast furnace and 107.9 t/hr from the direct smelting vessel. The steelmaking vessel produces 32.6 t/hr slag and 5.6 t/hr dust. The direct smelting vessel takes 27.7 t/hr slag and 4.7 t/hr dust. These amounts equate to 84.9% and 83.9%, respectively of the slag and dust produced by the steelmaking vessel. The total iron ore feed to the direct smelting vessel is 205.6 t/hr iron ore fines, steelmaking slag, steelmaking dust, and recycled smelting process dust. The direct smelting vessel produces 38.1 t/hr slag and 107.9 t/hr iron.

It is evident from the above that a significant amount (27.7 t/hr) of slag from the steelmaking vessel is used in the direct smelting vessel and thereby reduces the iron and flux units required from other sources.

The present invention has a number of advantages over the prior art, including:

(a) reducing the amount of waste steelmaking slag required to be disposed of from a steelmaking plant;

(b) recovering flux units and iron units in the steelmaking slag; and, (c) reducing the quantity of fresh flux and iron units required to be fed to an ironmaking process when using recycled steelmaking slag.

Many modifications may be made to the embodiments of the present invention described above without departing from the spirit and scope of the invention.

For example, whilst the embodiments of the present invention have been described in the context of the use of the HIsmelt process, it is understood that the present invention is applicable to any ironmaking process whereby the phosphorus fed to the ironmaking process reports preferentially to the ironmaking slag. Such other ironmaking processes may include by way of example the Romelt and DIOS processes.

In addition, whilst the embodiments of the present invention include pre-treatment units in the form of preheaters, the present invention extends to any suitable form of pre-treatment units and to arrangements that do not include preheaters.

The invention claimed is:

1. A process that includes the steps of:
   (a) producing molten steel and molten steelmaking process in a steelmaking vessel, the steelmaking slag including iron units and flux units; and
   (b) producing molten iron in a direct smelting process in a direct smelting vessel containing a molten bath of iron and iron-making slag by supplying iron ore or pre-treated iron ore and carbonaceous material to the direct smelting vessel as a part of the feed material requirements of the direct smelting process and using a substantial portion of the steelmaking slag from step (a) as another part of the feed material requirements for the direct smelting process and smelting the iron ore or pre-treated iron ore and iron units to produce molten iron,
wherein the direct smelting process includes using a slay forming went to provide flux units in addition to the flux units provided by the steelmaking slag, injecting the slag forming agent directly into the direct smelting vessel as opposed to pre-treating the slag forming agent before injection into the vessel as is the case with the steelmaking slag.

2. The process defined in claim 1 wherein step (b) includes using at least 70% by weight of the steelmaking slag as said another part of the feed material requirements for the direct smelting process.

3. The process defined in claim 1 wherein step (b) includes using at least 80% by weight of the steelmaking slag as said another part of the feed material requirements for the direct smelting process.

4. The process defined in claim 1 wherein step (b) includes using at least 90% by weight of the steelmaking slag as said another part of the feed material requirements for the direct smelting process.

5. The process defined in claim 1 wherein step (b) includes using sufficient steelmaking slag to provide at least 50% by weight of the flux units of the feed material requirements of the direct smelting process.

6. The process defined in claim 1 wherein the process is an integrated steelmaking process and includes producing molten iron in at least one ironmaking vessel and supplying the molten iron as a ferrous feed material for step (a).

7. The process defined in claim 1 further including using iron produced in step (b) as at least part of the ferrous feed material for producing steel in step (a).

8. The process defined in claim 1 further including using iron produced in step (b) and in at least one other ironmaking vessel as the ferrous feed material for producing steel in step (a).

9. The process defined in claim 1 wherein the direct smelting process is a molten bath-based process in which solid feed materials are injected significantly deeper into the molten bath.

10. The process defined in claim 1 further including pre-treating ferrous feed material including the steelmaking slag containing iron and flux units for step (b) by at least heating the ferrous feed material in a pre-treatment unit.

11. The process defined in claim 10 wherein the pre-treatment step includes preheating the ferrous feed material to at least 400° C.

12. The process defined in claim 11 wherein the pre-treatment step includes preheating the ferrous feed material to at least 700° C.

13. The process defined in claim 10 wherein the pre-treatment step includes preheating the ferrous feed material to a temperature less than 1050° C.

14. The process defined in claim 10 wherein the pre-treatment step includes preheating the ferrous feed material to a temperature less than 900° C.

15. The process defined in claim 10 wherein the pre-treatment step includes wet scrubbing an offgas produced in the step and using wet sludge containing steelmaking slag in the process.

16. The process defined in claim 1 wherein an amount of slag forming agent injected directly into the direct smelting vessel is sufficient to provide up to 30% by weight of the flux requirements.

17. The process defined in claim 16 wherein the slag forming agent includes calcium oxide.

18. The process defined in claim 1, further including cooling the steelmaking slag produced in step (a) prior to using at least a portion of the steelmaking slag in step (b).

19. The process defined in claim 18 further including reducing the size of the cooled steelmaking slag prior to adding the steelmaking slag in step (b).

20. A direct smelting process for producing molten iron in a direct smelting vessel containing a molten bath of iron and iron-making slag, the process including the steps of:
(a) pre-treating ferrous feed material including steelmaking slag containing iron and flux units in a pre-treatment unit by at least heating and at least partially reducing the ferrous feed material; and
(b) direct smelting molten iron in a direct smelting vessel containing a molten bath of iron and iron-making slag by supplying iron ore or pre-treated iron ore and carbonaceous material to the direct smelting vessel as a part of the feed material requirements of the direct smelting process and using a substantial portion of the pre-treated ferrous feed material including steelmaking slag from step (a) as another part of the feed material requirements for the direct smelting process and smelting the iron ore or pre-treated iron ore and iron units to produce molten iron using a slag forming agent to provide flux units in addition to flux units provided by the steelmaking slag and injecting the slag forming agent directly into the direct smelting vessel as opposed to pretreating the slag forming agent before injection into the vessel as is the case with the steelmaking slag.

21. The process defined in claim 20 wherein step (a) includes heating the ferrous feed material to at least 400° C.

22. The process defined in claim 20 wherein step (a) includes heating the ferrous feed material to at least 700° C.

23. The process defined in claim 20 wherein step (a) includes preheating the ferrous feed material to a temperature less than 1050° C.

24. The process defined in claim 20 wherein step (a) includes preheating the ferrous feed material to a temperature less than 900° C.

25. The process defined in claim 20 wherein step (a) includes wet scrubbing an offgas produced in the step and using wet sludge containing steelmaking slag in the process.

26. The process defined in claim 20 wherein an amount of slag forming agent injected directly into the direct smelting vessel is sufficient to provide up to 30% by weight of the flux requirements.

27. The process defined in claim 20 wherein an additional slag forming agent includes calcium oxide.

28. The process defined in claim 20 wherein step (b) includes controlling conditions within the direct smelting vessel to partition phosphorus to the slag by maintaining the slag in an oxidising condition whereby the partition ratio of phosphorus in the iron to phosphorus in the slag is at least 1:5.

29. The process defined in claim 20 wherein step (b) includes controlling conditions within the direct smelting vessel to partition phosphorus to the slag by maintaining the slag temperature to be in the range of 1350-1450° C. and the amount of FeO in the slag to be at least 3% by weight.

* * * * *

UNITED STATES PATENT AND TRADEMARK OFFICE
CERTIFICATE OF CORRECTION

| | | |
|---|---|---|
| PATENT NO. | : 7,935,172 B2 | Page 1 of 1 |
| APPLICATION NO. | : 10/587469 | |
| DATED | : May 3, 2011 | |
| INVENTOR(S) | : Rodney James Dry et al. | |

It is certified that error appears in the above-identified patent and that said Letters Patent is hereby corrected as shown below:

Column 9, line 4, please delete "slay" and replace with --slag--

Column 9, line 5, please delete "went" and replace with --agent--

Signed and Sealed this
Fifth Day of July, 2011

David J. Kappos
*Director of the United States Patent and Trademark Office*